United States Patent [19]

Richer

[11] Patent Number: 5,201,641
[45] Date of Patent: Apr. 13, 1993

[54] ELECTRICALLY DRIVEN DIAPHRAGM SUCTION OR PRESSURE PUMP

[76] Inventor: Siegfried Richer, Rudolfstrasse 3, W-7798 Pfullendorf, Fed. Rep. of Germany

[21] Appl. No.: 818,783

[22] Filed: Jan. 9, 1992

[51] Int. Cl.$^5$ .............................................. F04B 35/04
[52] U.S. Cl. ........................................ 417/417; 310/23
[58] Field of Search ................... 417/416, 417; 310/15, 310/17, 23

[56] References Cited

U.S. PATENT DOCUMENTS 3,067,404 12/1962 Hildebrandt ........................... 310/15
5,073,095 12/1991 Thomas, Sr. ......................... 417/417

FOREIGN PATENT DOCUMENTS 0110871 7/1983 Japan ................................... 417/417

*Primary Examiner*—Richard A. Bertsch
*Assistant Examiner*—Charles G. Freay
*Attorney, Agent, or Firm*—McGlew and Tuttle

[57] ABSTRACT

An electrically driven diaphragm suction or pressure pump includes an oscillating anchor magnet that serves as the driving motor. The oscillating anchor magnet has a magnet coil (16), which is concentrically enclosed by a ferromagnetic closing cage (19) which is discontinuous in a circumferential direction. In the interior space of the magnet coil (16), the closing cage forms two pole rings (25,26), separated from one another in the axial direction by a circular slot (27). The closing cage is tightly arranged in a case (28,29). To obtain a high efficiency and high pump capacities, the central anchor shank (39), which is connected to the pump diaphragm, of the oscillating anchor (8), which is provided with a ferromagnetic solenoid plunger (38), is attached to two leaf-type vibratory springs (42, 43), each of which carries and centers on one side an end section projecting out of the closing cage (19) of the magnet coil (16). Both of these vibratory springs are shaped the same and attached, at an axial distance from the closing cage (19), with their respective base sections (48) to contact surfaces (61, 62) of the case (28, 29), which are arranged diametrically opposite on different sides of the system axis (9) and at equal distance from this system axis (9).

18 Claims, 4 Drawing Sheets

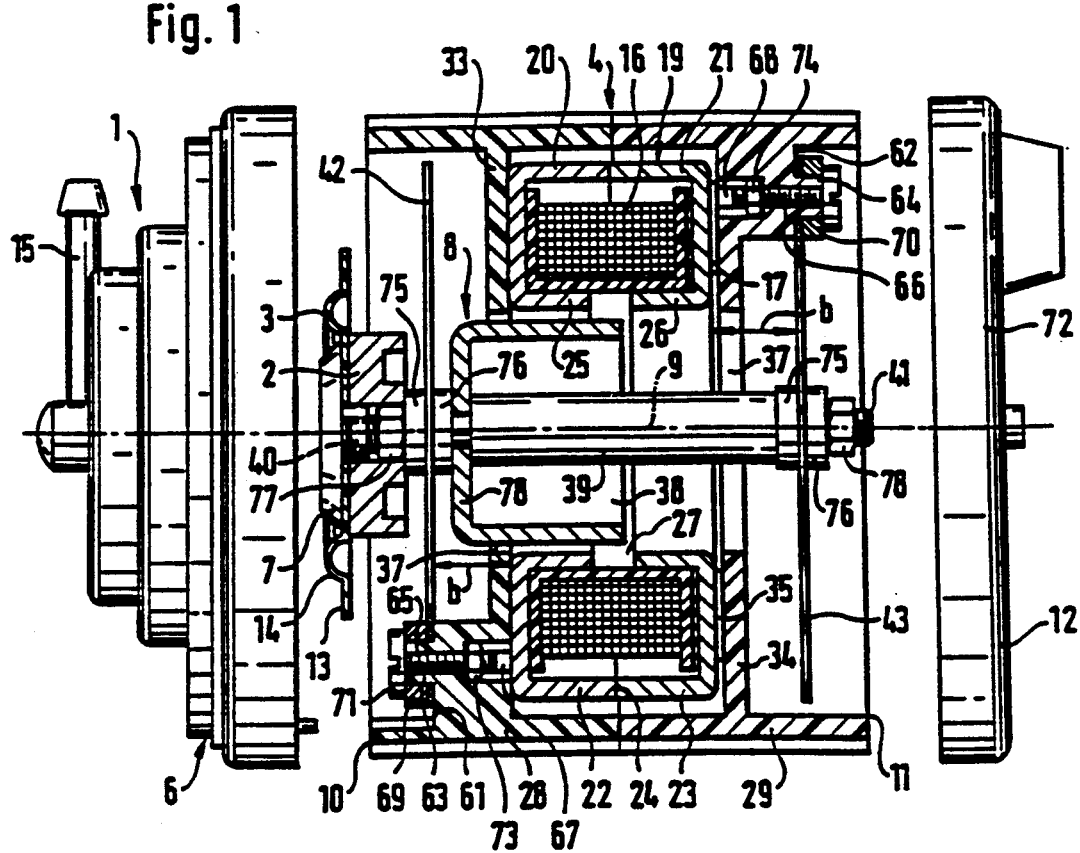
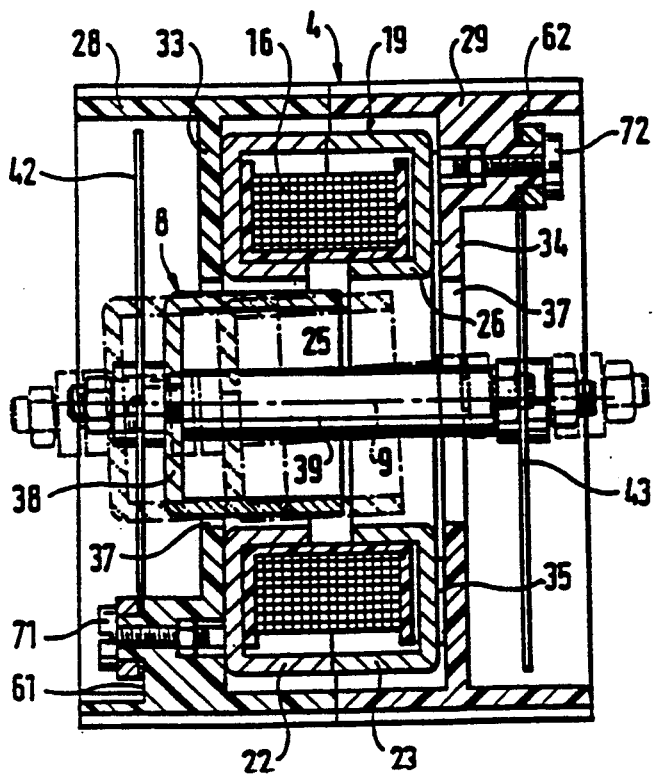
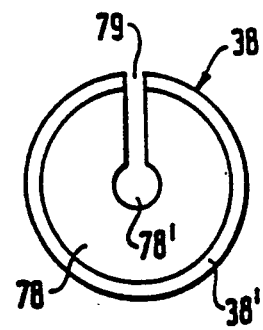

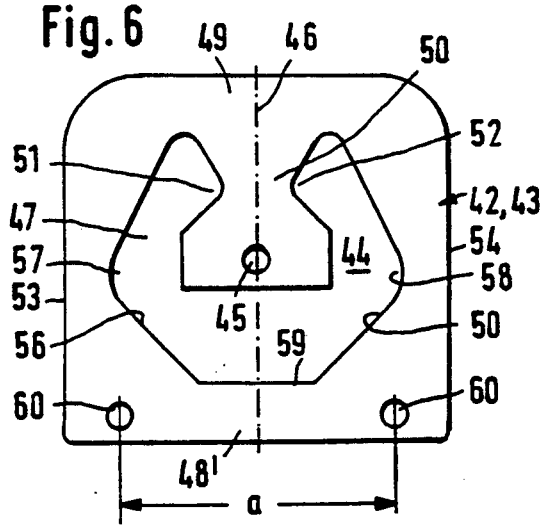
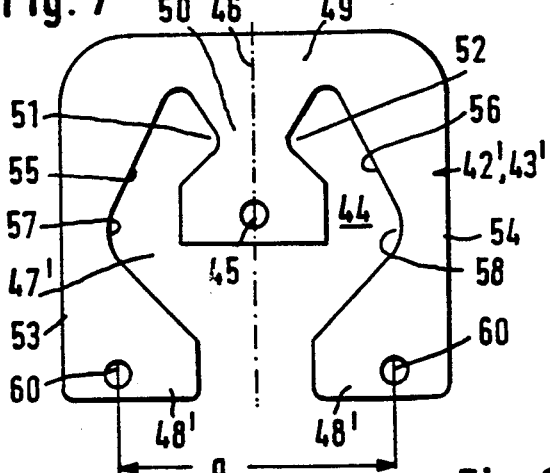
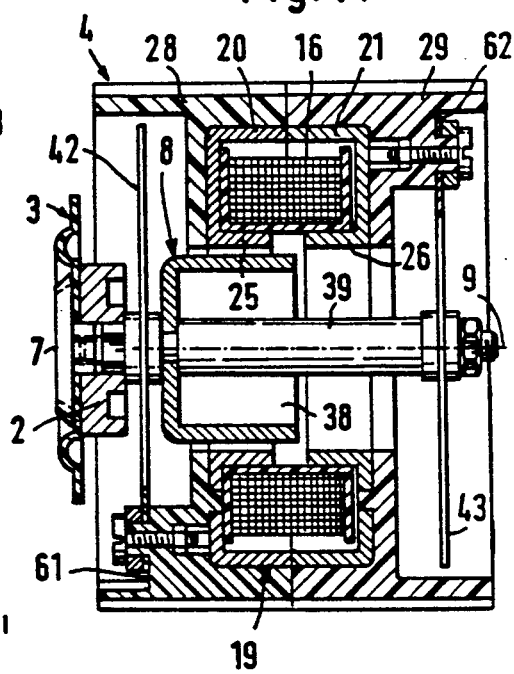
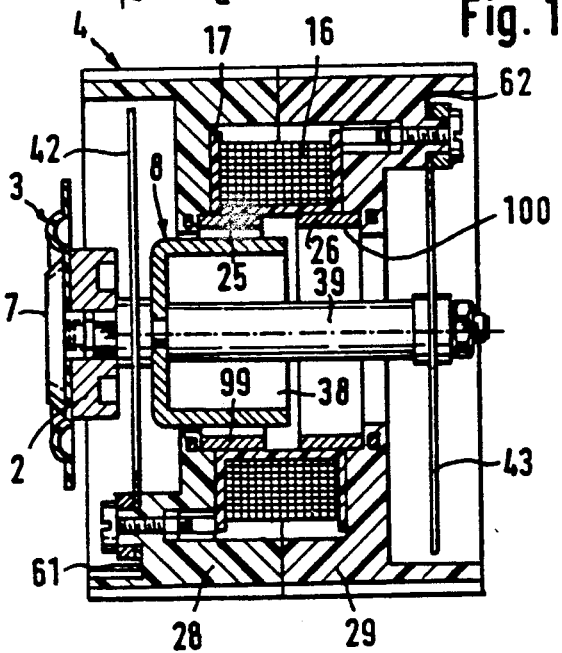
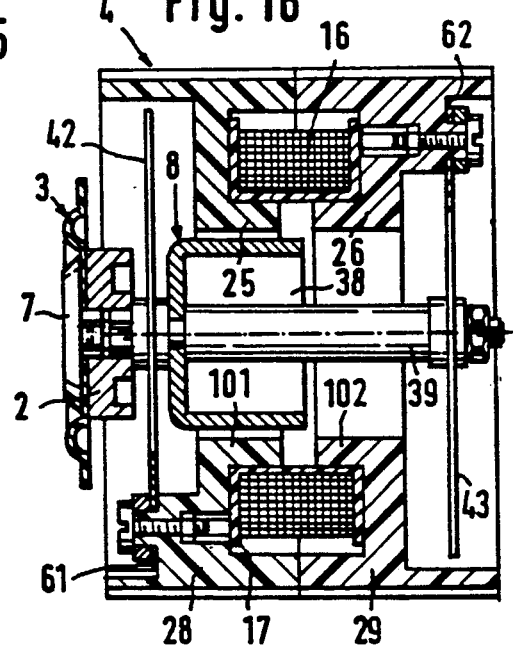

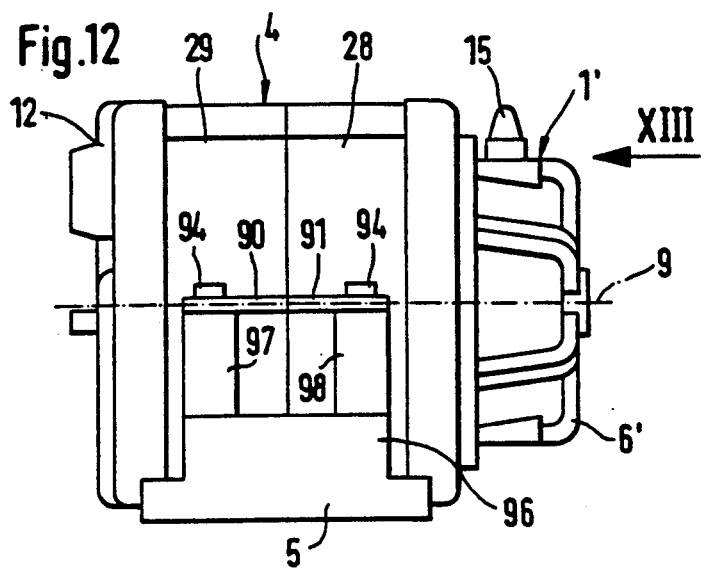
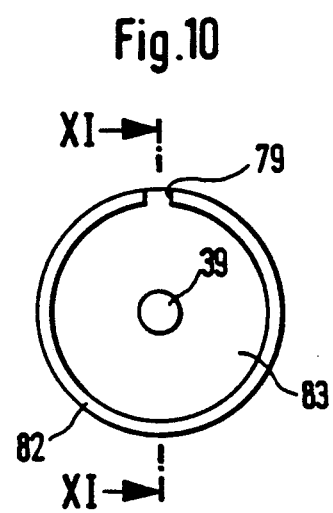
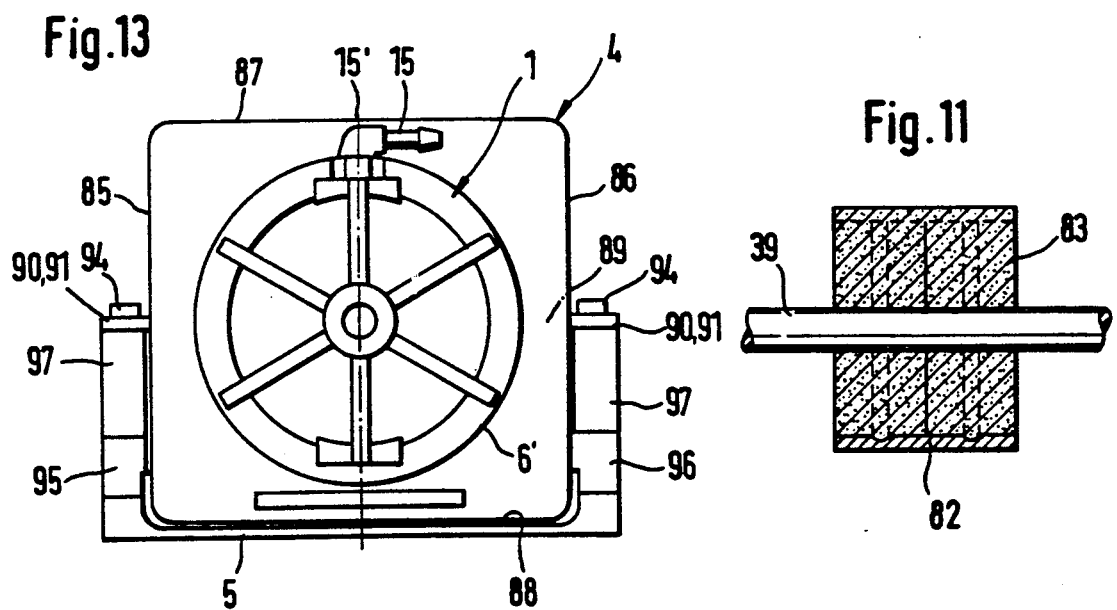
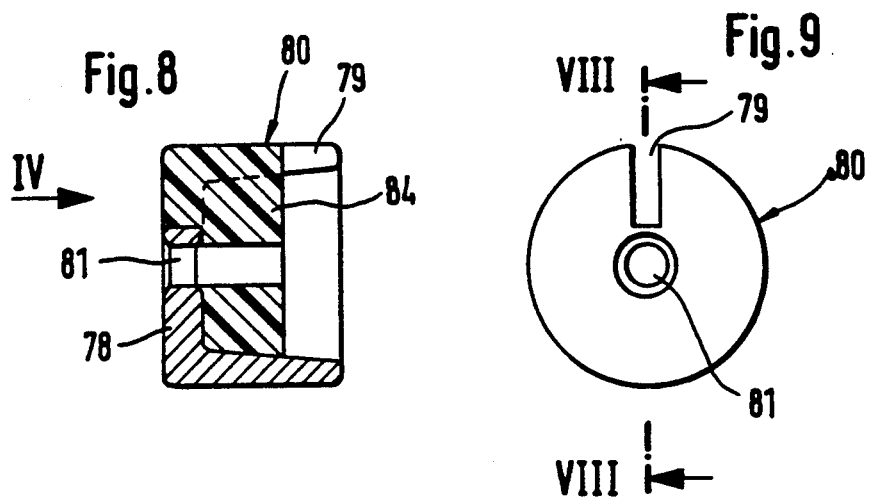

ELECTRICALLY DRIVEN DIAPHRAGM SUCTION OR PRESSURE PUMP

FIELD OF THE INVENTION

The present invention pertains to an electrically driven diaphragm suction or pressure pump with an oscillating anchor magnet as the driving motor, which has a circular magnet coil with an at least approximately cylindrical interior space, the interior space is concentrically enclosed by a ferromagnetic closing cage, the closing cage is discontinuous in the direction of circumference, and is tightly arranged in a case, whereby an oscillating anchor, consisting of a ferromagnetic solenoid plunger and a central anchor shank, which is connected to the pump diaphragm and is axially spring mounted, is located in the interior space of the closing cage in coaxial arrangement to the common system axis of the magnet coil and the closing cage.

BACKGROUND OF THE INVENTION

Such diaphragm pumps are used both as compressors, i.e., as pressure pumps, and as vacuum pumps, i.e., as suction pumps, as compressors, e.g., in connection with inhalations devices for fine pulverization of liquid medications or as vacuum pumps in chemical or physical laboratories. As a rule, their suction capacities as vacuum pumps are approximately 2 L/minute, and as compressors, their suction capacities are between 30 L/minute and 100 L/minute; at flow pressure of 0.6 bar to 1 bar, their pump capacities are between 7 L/minute and 20 L/minute. As a rule, they are operated with the generally standard power-supply voltage of 50 Hz or 60 Hz.

Besides the general requirements placed on such devices, namely that they operate noiselessly and allow the smallest construction possible, it is now also fundamental that these pumps require the least power consumption possible or that they operate with a high efficiency.

SUMMARY AND OBJECTS OF THE INVENTION

It is an object of the present invention to produce a diaphragm pressure pump of the type mentioned above, in which the construction prerequisites for the requirements mentioned above are fulfilled in an optimal manner, i.e., that the driving motor, designed as an oscillating anchor magnet, has a low power consumption with a high suction capacity and/or pressure capacity, that is, a high efficiency, a long useful life and a noiseless operation as free from wear and tear as possible, and that the oscillating anchor magnet of the same design can be used both for a suction pump and for a pressure pump.

This task is solved in accordance with the present invention in that the closing cage in the interior of the magnet coil forms two pole rings which are separated from one another in the axial direction by a circular slot, and that the central anchor shank is attached to an end section projecting on one side from the closing cage of the magnet coil, supporting and centering on two leaf-type vibratory springs, both of which are shaped the same, and both of which are attached, with an axial distance from the closing cage, to their respective end sections on contact surfaces of the case, which are arranged diametrically opposite on different sides of the system axis and at equal distance from this system axis.

While it is common in other known diaphragm pumps of the particular type to provide the oscillating anchor with a coaxial helical spring as an elastic recoil device, the use of leaf-type vibratory springs has the considerable advantage that no special bearing devices are necessary for the anchor shank and that no bearing friction occurs with the oscillating movements of the oscillating anchor. In the use of leaf-type vibratory springs, it is unavoidable that the oscillating anchor, during its axial oscillating movements, also executes a radial movement in relation to the system axis. However, to obtain a high electromagnetic efficiency, it is necessary to keep the air gap between the oscillating anchor and the pole rings as small as possible. Therefore, it is also necessary to keep the radial deflection of the oscillating anchor as small as possible. This is achieved in accordance with the present invention by the diametrically displaced attachment of the vibratory springs, as is explained below in greater detail with the help of the drawings. The basic construction prerequisites necessary for obtaining a high efficiency and for avoiding high losses in capacity are achieved by the characteristics of the present invention mentioned, namely a frictionless storage of the oscillating anchor and a small air gap between the oscillating anchor and the pole rings of the closing cage.

With the arrangement of the pump unit including the pump diaphragm and inlet and outlet valves on a tension side of the oscillating anchor, the oscillating anchor magnet can produce its optimal capacity as a driving motor for a diaphragm suction pump. The end of the anchor shank, which is pulled into the closing cage in the power stroke caused by magnetic force, is understood by "tension side of the oscillating anchor."

With the arrangement of the pump unit with the pump diaphragm and the inlet and outlet valves on the pressure side of the oscillating anchor, the same oscillating anchor magnet can produce its optimal capacity as a driving motor for a diaphragm pressure pump. The end of the anchor shank, which moves out of the closing cage in the power stroke caused by magnetic force, is understood by "pressure side of the oscillating anchor."

Another improvement in efficiency is achieved by the design the invention wherein the vibratory springs, rectangular or square in their surface shape, have a spring tongue in vibratory spring center which is cut free by a notch, the notch is symmetrical to the axis of symmetry running transverse to the end section, on a side facing the end section as well as on a side running parallel to the axis of symmetry, to which one end of the anchor shank is attached, insofar as the radial deflection of the oscillating anchor is further reduced during its oscillating movements. In this case, the curved course of a relatively long bending radius of the vibratory spring is compensated by an opposite curved movement course with a shorter, approximately half as large, radius.

By means of the shape of the vibratory springs, wherein the spring tongue is provided with triangular notches which are symmetric to the axis of symmetry, on both side on its section which is directly connected to the cross bar opposite the end section connected to it, and that the two connection sides, connecting the end section to the cross bar, have internal limiting borders, which are formed from isosceles-triangular notches, not only is an optimal oscillating movement of the oscillating anchor achieved, but a high breaking strength of the leaf-type vibratory springs themselves is also achieved.

It is a further object of the invention to provide a suction or pressure pump which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partially sectional view of an electrically driven diaphragm suction pump of the type according to the present invention with cross section of the oscillating anchor magnet;

FIG. 1a is a front view of a cup-shaped solenoid plunger;

FIG. 2 is a cross sectional view of oscillating anchor magnet of FIG. 1 showing the three most fundamental movement positions of the oscillating anchor;

FIG. 6 is a front view of a vibratory spring;

FIG. 7 is a front view of another embodiment of the vibratory spring;

FIG. 8 is a cross sectional view taken along line VIII—VIII from FIG. 9 showing a cup-shaped magnet anchor;

FIG. 9 is a front view taken in the direction of arrow IX of FIG. 8;

FIG. 10 is a front axial view of another embodiment of the magnet anchor;

FIG. 11 is a cross sectional view taken along line XI—XI from FIG. 10;

FIG. 12 is a front view of a diaphragm pressure pump;

FIG. 13 is a front view taken in the direction of arrow XIII from FIG. 12;

FIG. 14 is a cross sectional view of an oscillating anchor magnet, in which the two halves of the closing cage are fused in the case;

FIG. 15 is a cross sectional view of the oscillating anchor magnet, in which the two pole rings are fused in the case parts, the pole rings being formed of synthetic material or ceramic strengthened with iron fragments; and FIG. 16 is a cross sectional view showing an oscillating anchor magnet, in which the two case parts, including the two pole rings, are fused as one piece from synthetic material or ceramic strengthened with iron fragments.

DETAILED DESCRIPTION OF THE PREFERRED EMBODIMENTS

Figure 3:
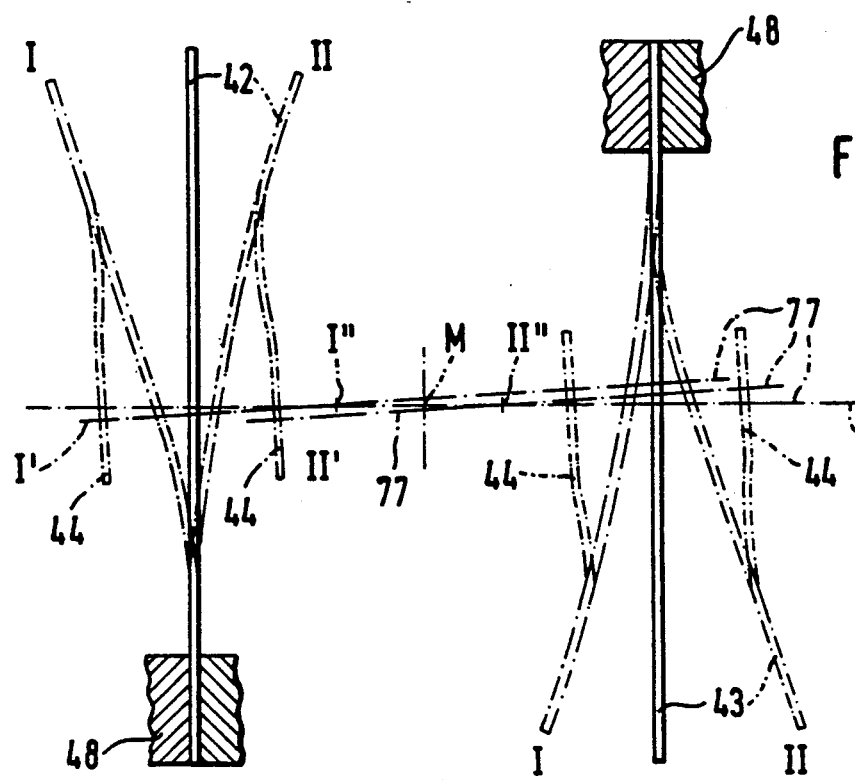
FIG. 3 is a system representation depicting the movement course of the oscillating anchor.

The diaphragm suction shown in FIG.1 comprises a suction pump generally designated 1 with a pump diaphragm 3 attached to a central diaphragm support 2, as well as an oscillating anchor magnet generally designated 4, which, as is evident from FIGS. 12 and 13 is elastically mounted on a stationary base 5 in a manner explained in detail below.

The pump diaphragm 3 is, in the usual manner, arranged clamped in a pump case generally designated 6, which is composed of several parts, between two case parts of the pump case 6 and is attached by means of a plate-shaped nut 7 together with the piston-like diaphragm support 2 to an oscillating anchor 8 of the oscillating anchor magnet 4, especially such that it is arranged coaxially to the system axis 9 of the oscillating anchor 8.

The pump case 6 shown in FIG. 1 in axial distance from the oscillating anchor magnet 4 is in actuality placed on the front side 10 of the oscillating anchor magnet 4 and is attached to it by means of screw connections. On the opposite front side 11 of the oscillating anchor magnet is arranged a lid 12 which is also screwed on. Both the pump case 6 and the lid 12 consist of synthetic material parts. The pump diaphragm usually consist of a thin, elastic, circular disk with an approximately semi-circular, profiled ring bead 14 between its flat clamping edge 13 and the plate-shaped nut 7.

Even the plate-shaped nut 7 and the diaphragm support 2 are designed as synthetic material parts.

The valves necessary for the conducting a pumping process, namely an inlet valve and an outlet valve, are placed in the pump case 6. Moreover, the pump case 6 is provided with a hose connection piece 15, which can run radially, as in FIG. 1, or as in FIG. 13, at a right angle to a radial plane 15'.

Figure 4:
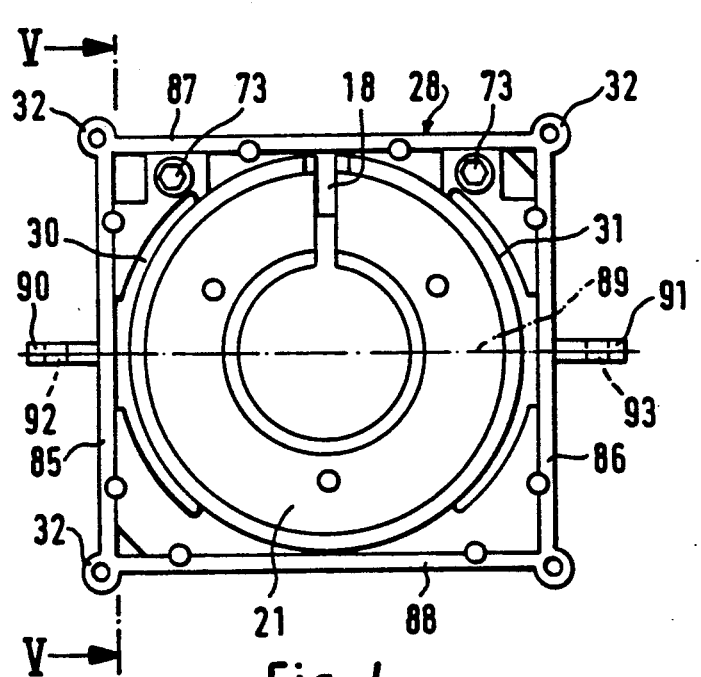
FIG. 4 is an the internal front view of a case half.

The oscillating anchor magnet 4 has a round magnet coil 16 with a U-shaped, profiled coil body 17 arranged concentric to the system axis 9, which is enclosed by a ferromagnetic closing cage 19 which is discontinuous in the direction of circumference on one position by a radial groove 18 (FIG. 4). The closing cage 19 consists of two completely equally shaped circular shells 20 and 21 with a U-shaped cross-sectional profile. While the outer cylinder walls 22 and 23 of the two circular shells 20,21 with planar front surfaces abut against an intersection without slits, their inner annular collars, which form the pole rings 25 and 26, projecting into the cylindrical interior space of the magnet coil body 17, are designed smaller so that between them there is an axial circular slot 27, the magnetic scatter field of which causes the anchor movements.

Figure 5:
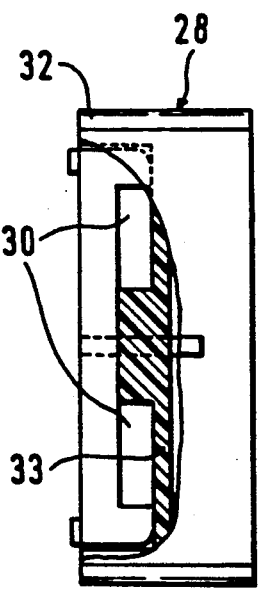
FIG. 5 is a partial cross-sectional lateral view of FIG. 4 taken along line V—V.

The two circular shells 20 and 21 forming the closing cage 19 are contained in one of two completely equally designed case halves 28 and 29 centered between two centering ribs 30 and 31 visible in FIGS. 4 and 5. The two case halves 28 and 29 have rectangular shape in the front view and are provided in their corners with eyes 32 bored through in the longitudinal direction, through which tightening screws are inserted, with which the two case halves 28,29, tightened. Approximately in their longitudinal center, the two case halves 28,29 are provided with a radial wall 33 or 34 on the opposite inner sides of which are arranged the circular centering ribs 30 and 31. In order to be able to balance manufacturing tolerances, a wave-like spring plate 35 is arranged between the radial wall 34 of one case half 29 and the circular shell 21 contained by it. The two radial walls 33 and 34 are provided with central, circular openings 36 or 37, the diameter of which correspond approximately to the inner diameter of the two pole rings 25,26.

The oscillating anchor 8 is composed of a ferromagnetic solenoid plunger 38, designed as a cup-shaped hollow body, and of a nonmagnetic anchor shank 39, which on both sides projects axially from the closing cage 19, and on its two ends, has threaded lugs 40 and 41 which are reduced in diameter.

In the oscillating anchor magnet 4 shown in FIGS. 1 and 2, as well as 14 to 16, the pump diaphragm 3 is arranged on the tension side of the oscillating anchor 8, i.e., it is attached to the end of the anchor shank 39, which is pulled into the closing cage 19 in the power stroke of the oscillating anchor 8 produced by magnetic force. With this arrangement of the pump diaphragm 3 or of the entire suction pump unit, the oscillating anchor magnet 4 produces its optimal operating capacity as the driving motor for a diaphragm suction pump.

By means of these threaded lugs 40 and 41, the anchor shank 39 is attached to two leaf-type vibratory springs 42 and 43. These vibratory springs 42, 43 have either the shape shown in FIG. 6 or the shape shown in FIG. 7, both of which are distinguished by a rectangular or square surface shape and in their center area are provided with a spring tongue 44, which has a central bore hole 45 for the insertion of one of the two threaded lugs 40 or 41. This spring tongue 44 extends from a first cut free by a notch 47 or 47', shaped symmetrical to the axis of symmetry 46, on the side facing the end section or second side 48, 48' as well as on its side running parallel to the axis of symmetry 46. In this case, the spring tongue 44 is provided with triangular notches 51, 52, symmetrical to the axis of symmetry 46 on both sides, on its section 50 which is directly connected to the crossbar 49 opposite the end section 48 or 48' connected to it. Also, the connection sides 53, 54, connecting the end sections 48' to the upper crossbar 49, have internal limiting borders 55 and 56, which are formed from V-shaped notches 57, 58. The two vibratory springs 42 and 42' of FIGS. 6 and 7 are different in that, in the vibratory spring 42, the two connection sides 53 and 54 are connected to one another on the end section 40 by a connection crosspiece 59, while the end sections 48' embodiment of FIG. 7 have no such connection crosspiece 59. The presence of the connection crosspiece 59 has the advantage that the distance a of the two attachment bore holes 60 provided in the end section 48 is constant, and that one thereby has such the possibility of carrying out the hardening of the vibratory spring 42 only after punching it out. In open end section 48' of the vibratory spring 42 shown in FIG. 7, the distance changes with subsequent hardening such that difficulties in the assembly may occur. This shape of the vibratory spring according to FIG. 7 is therefore preferably punched out of leaf-spring material that has already been hardened. It is obvious that the molding times of the punching dies are thus shorter than when punching out soft materials.

For attaching the two completely equally designed vibratory springs 42 and 43, which can have the shape shown in FIG. 6 or that shown in FIG. 7, flat contact surfaces 61 and 72 with centering collars 63 and 74 and continuous connection bore holes 65 and 66 are arranged on the outer sides of the radial walls 33 and 34 at a certain axial distance b from the closing body 19, running radially and at a right angle to the system axis 9. The connection bore holes 65, 66 open into expanded hexagonal 67 or 68. The centering collars 63 and 64 serve for the centering insertion of the attachment bore holes 59 and 60 of the two vibratory springs 42 and 43.

Accordingly, with a space of a tensioning bar 69, 70, the end sections 48 of the vibratory springs 42, 43 are tightly attached by means of screws 71 and 72 and nuts 73 and 74 to the two case halves 28 and 29, respectively. Thus, it is important that the two contact surfaces 61 and 62, which contain the end sections 48 of the vibratory springs 42 and 43, are arranged on diametrically opposed sides of the system axis 9. This arrangement is produced in that the two completely equally designed case halves 28, 29 are joined in one another in a mirror-inverted manner and opposite one another, rotated by 180°. By this arrangement, it can especially be achieved that the radial deflection of the anchor shank 39 and thus also of the solenoid plunger 38 are reduced to a minimum in the operation, i.e., in the oscillating movements of the oscillating anchor 8. It should be added that the spring tongue 44 of the two vibratory springs 42 and 42 are tightened between two clamping plates 75 and 76 by means of threaded nuts 77 or 78 on the threaded lugs 40 and 41 of the anchor shank 39. By this means, the movement or changes in position of the anchor shank 39, schematically shown in FIG. 3, occur. The two vibratory springs 42 and 43 are shown in their resting position in unbroken lines in FIG. 3. By means of oscillating deflections to the left and to the right, the end positions I and II, shown in dot-dash lines are produced. While the axis 77 of the anchor shank 39 in the resting position and thus of the entire oscillating anchor coincides with the system axis 9, the axis 77 assumes transverse positions I' and II'', which runs parallel to one another, in the two end positions I and II of the oscillating anchor, shown in a somewhat exaggerated manner in FIG. 3. However, the axial central point M, which lies exactly in the center between the two vibratory springs 42 and 43, thus moves on the system axis 9 between position I'' and position II''.

It is evident from FIG. 3 that the axial deflection of the vibratory spring 42 simultaneously results in a radial deflection of the spring tongue 44 downwards and the axial deflection of the spring tongue 43 at the same time results in a radial deflection of the spring tongue 44 upwards.

However, these radial deflections are for the most part again compensated by the bending areas of the vibratory springs 42, 43, lying on different sides of the system axis 9, as overall and the spring tongue 44 as part of it, especially because the bending radii are of different magnitudes. The bending radius of the entire vibratory spring 42, 43 is approximately twice as great as the bending radius of the spring tongue 44. Thus altogether, the smallest possible radial deflection of the solenoid plunger 8 is obtained such that the radial deflection between the circumference of the solenoid plunger 38 and the inner wall of the two pole rings 25, 26 can be very small.

The transverse position of the axis 77 of the oscillating anchor, schematically shown in FIG. 7 is shown in FIG. 2 in dot-dash lines, in which it can be seen that the radial deviation in position of the central resting position, which is concentric to the system axis 9, is only small.

Otherwise, with this type of axial, movable suspension of the oscillating anchor 8, a relatively large power stroke is also obtained and any friction in position is avoided. There is no wear and tear, and no lubrication is required.

To reduce the losses in capacity or to increase the electromagnetic efficiency, not only are the two circular shells 20, 21 of the closing cage 19 provided with the radial groove 18 for the prevention of eddy currents, but the cylindrical wall 38' of the cup-shaped plunger 38 is also provided with an axial-radial groove 79 (FIG. 1a), which continues in its front wall 78 and opens into the central bore hole 78'.

While the cup-shaped solenoid plunger 38, shown in FIG. 1a as a single part, is designed as a deep-drawn hollow body, the cup-shaped solenoid plunger 80, shown in FIGS. 8 and 9, consists of a sintered molded body, in which the radially running part of the axial-radial groove 79 does not reach up to the central bore hole 81, in order to reduce the danger of breaking. In contrast, in the deep-drawn solenoid plunger 38, the subsequently scored axial-radial groove 79 can reach into the bore hole 78'. In both cases, the formation of eddy currents is reduced by means of this axial-radial groove 79 to the extent that the rise in temperature and thus also the losses in eddy currents are held within acceptable limits.

In FIGS. 10 and 11 there is disclosed a solenoid plunger, consisting of a ferromagnetic tube-shaped body 82 provided with a groove 79 continuous in the longitudinal direction, which is provided with a non-magnetic filler 83, e.g., made of ceramic, of an Sn-Pb alloy or the like, and by this means, is attached to the anchor shank 39.

the sintered solenoid plunger 80 of FIGS. 8 and 9 can also be provided with a fused filler 84, which serves to determine the natural frequency of the oscillating anchor 8 deviating from its operating frequency, especially to place it at a lower value. As is evident from FIGS. 4, 12 and 13, the two case halves 28 and 29 posses on their outer sides 85 and 86, running parallel to the system axis 9, in a plane 89 running through this system axis 9 and parallel to the two other outer walls 87 and 88, suspension clips 90 and 91 projecting outward with bore holes 92 and 93 (FIG. 4), through which attachment screws 94 (FIGS. 12, 13) can be inserted.

The stationary base 5 is provided with supporting bars 95 and 96, projecting upwards on the sides 85 and 86 of the case halves 28, 29, on which two cylindrical and axial bored rubber elastic supporting poles 97, 98 are arranged in the upright position, on which are mounted the suspension clips 90 and 91 of the two case halves 28 and 29.

By means of this storage of the entire oscillating anchor magnet 4 with the pump unit 1 constructed on the front side by means of rubber elastic supporting poles 97, 98 in the plane 89 of the system 9, not only is an oscillation-restraining storage obtained, but also any slanting of the oscillating anchor magnet 4, which could be caused in another positioning by oscillating movements of the oscillating anchor 8, is avoided. A diaphragm pressure pump is shown in FIGS. 12 and 13. This is different from the previously disclosed diaphragm suction pump primarily in that it has another a pressure pump unit 1', which is arranged on the pressure side of the oscillating anchor 8, i.e., the pump diaphragm 3 and the pump case 6', and is shaped differently and arranged on the end of the anchor shank 39, which is moved out of the closing cage 19 in the power stroke of the oscillating anchor 8 produced by magnetic force. By this arrangement, the oscillating anchor magnet produces its optimal operating capacity as a driving motor for a diaphragm pressure pump.

It should also be mentioned that an optimal operation of the pump diaphragm 3 in a suction pump and in a pressure pump involves the correct arrangement of its ring bead 14. In a suction pump, its arrangement appears such that it, as shown in FIG. 1, lies on the side turned away from the anchor shank 39. In contrast, in a pressure pump, it should be arranged on the side facing the anchor shank 39. That is, the pump diaphragm 3 should be arranged such that its ring bead 14 is located on the side of the lower operating pressure.

To an oscillation-free storage of the case consisting of the two case halves 28 and 29, it is also contributed that this case consists of diecasting and therefore has a large inert mass, the natural frequency of which lies essentially below the operating frequency of the oscillating anchor even when it is operated at an operating frequency of 50 Hz or 60 Hz.

In FIG. 14 there is shown an embodiment, in which the two circular shells 20 and 21, which form the closing body 19, are tightly fused in a case half 28 or 29, the remaining shape of which is as in the exemplified embodiment of FIGS. 1 and 4.

In the exemplified embodiment shown in FIG. 15, the two case halves 28 and 29 consist of a synthetic material strengthened with iron fragments, and they are prepared in the injection molding process. Two soft iron rings 99 and 100 are injection molded as the pole rings.

In the exemplified embodiment of FIG. 16, the two case halves 28 and 29 are prepared together as one piece in the injection molding process from a synthetic material strengthened with iron fragments. It can be seen that, in this case, the cylindrical inner walls 101 and 102 forming the two pole rings have a greater wall thickness than the soft iron rings of FIG. 15. This is necessary in order to attain the necessary magnetic field strengths between these two pole rings 101 and 102, when the magnetic saturation limit, which depends on the magnetic conductibility, lies essentially below that of soft iron.

The remaining arrangements of the oscillating anchor magnet shown in FIGS. 14, 15 and 16 are the same as in the embodiment described above with the help of FIGS. 1 to 13.

While specific embodiments of the invention have been shown and described in detail to illustrate the application of the principles of the invention, it will be understood that the invention may be embodied otherwise without departing from such principles.

What is claimed is:

1. An electrically driven diaphragm suction or pressure pump, comprising: driving means including an oscillating anchor magnet, said anchor magnet including a circular magnet coil with a substantially cylindrical interior space, said substantially cylindrical interior space being concentrically enclosed by a ferromagnetic closing cage, said ferromagnetic closing cage being discontinuous in a circumferential direction; a case, said ferromagnetic closing cage being tightly positioned in said case; an oscillating anchor including a ferromagnetic solenoid plunger and a central anchor shank; a pump diaphragm connected to said oscillating anchor; a first leaf-type vibratory spring and a second leaf-type vibratory spring, each of said first leaf-type vibratory and said second leaf-type vibratory spring being connected to said oscillating anchor for mounting said oscillating anchor in an interior space of said closing cage in coaxial arrangement with respect to a common system axis of said magnet coil and said closing cage, said closing cage forming two pole rings in said interior space of said magnet coil, said two pole rings being separated from one another in an axial direction by a circular slot, said first leaf-type vibratory spring and said second leaf-type vibratory spring including a centered end section projecting out of a first side of each of said first and second leaf-type vibratory spring, said first leaf-type vibratory spring being shaped the same as said second leaf-type vibratory spring, said first leaf-type vibratory spring having a second side substantially opposite said first side and said second side is attached to said case at a first position, said first position being at an axial distance from said closing cage at one end of said case and said second leaf-type vibratory spring having a second side substantially opposite said first side and said second side is attached to said case at a second position, said second position being at an axial distance from said closing cage at another end of said case such that said second sides of each of said first and second leaf-type vibratory springs contact surfaces of said case, said second sides of said first leaf-type vibratory spring and said second leaf-type vibratory spring being arranged diametrically opposite on different sides of said system axis and at equal distances from said system axis.

2. A diaphragm suction pump according to claim 1, wherein said pump diaphragm and an inlet valve and outlet valve are arranged on a tension side of the oscillating anchor.

3. A diaphragm pressure pump according to claim 1, wherein said pump diaphragm, an inlet valve and an outlet valve are arranged on a pressure side of the oscillating anchor.

4. A diaphragm suction or pressure pump according to claim 1 wherein said vibratory spring are, rectangular or square in their surface shape and have a spring tongue in an area center, said spring tongue is cut free by a notch, said notch being a spring symmetrical to a spring axis of symmetry and running transverse to said second side, on the side facing said second side, as well as on its side running parallel to said spring axis of symmetry, and to which one end of the anchor shank is attached.

5. A diaphragm suction or pressure pump according to claim 4, wherein said spring tongue is provided with triangular notches, which are symmetric to said spring axis of symmetry, on both sides of a section which is directly connected to a crossbar opposite said second side, two connection sides, connecting said second side to said crossbar each have internal limiting borders, which are formed from isosceles-triangular notches.

6. A diaphragm suction or pressure pump according to claim 5, wherein said two connection sides of said first and second vibratory spring are connected to one another in the area of said second side by a connection crosspiece.

7. A diaphragm suction or pressure pump according to claim 1, wherein said ferromagnetic solenoid plunger comprises a tube-shaped or cup-shaped hollow body which is discontinuous at least on one position of a circumference by a continuous axial groove.

8. A diaphragm suction or pressure pump according to claim 7, wherein said axial groove continues in a radial groove of a front wall of said cup-shaped hollow body.

9. A diaphragm suction or pressure pump according to claim 7, wherein an additional oscillating body is arranged in the tube-shaped or cup-shaped hollow body for determining the natural oscillation of the oscillating anchor.

10. A diaphragm suction or pressure pump according to claim 9, wherein said additional oscillating body comprises a nonmagnetic and/or electrically nonconductive material.

11. A diaphragm suction or pressure pump according to claim 7, wherein said hollow body forming the solenoid plunger is prepared in a sintering process.

12. A diaphragm suction or pressure pump according to claim 1, wherein said case comprises two equally shaped, metal diecast parts, which tightly contain said closing body between them.

13. A diaphragm suction or pressure pump according to claim 1, wherein said case is mounted by means of suspension clips, arranged on outer sides of said case, running parallel to the system axis, in a plane of said system axis, on rubber elastic supporting poles of a stationary base otherwise not connected to the case.

14. A diaphragm suction or pressure pump according to claim 1, wherein said closing cage comprises two equally shaped, circular, deep-drawn circular shells having outer ring walls which are combined without slits with their planar front surfaces and which are provided, on an edge of a central, circular opening, with an annular collar directed inward, said annular collar having an axial length which is less that of said outer ring walls.

15. A diaphragm suction or pressure pump according to claim 14, wherein said two circular shells of the closing cage are each fused in a case half.

16. A diaphragm suction or pressure pump according to claim 1, wherein said case comprises of two equally shaped, molded parts, which are produced in the injection molding or shaping process from synthetic material or ceramic strengthened with iron fragments, a half of the closing cage is formed or fused in each of the two molded parts.

17. A diaphragm suction or pressure pump according to claim 16, wherein said closing cage, only said two pole rings, prepared from ferromagnetic material, are fused in the molded parts forming said case.

18. A diaphragm suction or pressure pump according to claim 1, wherein said pump diaphragm has an approximately semi-circular ring bead and is connected to said oscillating anchor such that said ring bead is located on a low-pressure end.

* * * * *